(12) United States Patent
Manning et al.

(10) Patent No.: US 10,167,725 B2
(45) Date of Patent: Jan. 1, 2019

(54) ENGINE COMPONENT FOR A TURBINE ENGINE

(71) Applicant: General Electric Company, Schenectady, NY (US)

(72) Inventors: Robert Francis Manning, Newburyport, MA (US); Victor Hugo Silva Correia, Milton Mills, NH (US); Jared Peter Buhler, Tewksbury, MA (US); Byron Andrew Pritchard, Jr., Loveland, OH (US); William Collins Vining, Schenectady, NY (US); Corey Bourassa, Mechanicville, NY (US); Gregory Michael Laskowski, Rowley, MA (US); David Vickery Parker, Middleton, MA (US)

(73) Assignee: General Electric Company, Schenectady, NY (US)

(*) Notice: Subject to any disclaimer, the term of this patent is extended or adjusted under 35 U.S.C. 154(b) by 583 days.

(21) Appl. No.: 14/861,522

(22) Filed: Sep. 22, 2015

(65) Prior Publication Data
US 2016/0123154 A1 May 5, 2016

Related U.S. Application Data

(60) Provisional application No. 62/073,525, filed on Oct. 31, 2014.

(51) Int. Cl.
*F04D 29/70* (2006.01)
*F01D 5/14* (2006.01)
(Continued)

(52) U.S. Cl.
CPC .............. *F01D 5/147* (2013.01); *F02C 7/05* (2013.01); *F02C 7/052* (2013.01); *F05D 2260/607* (2013.01); *Y02T 50/675* (2013.01)

(58) Field of Classification Search
CPC .. F01D 5/147; F02C 7/05; F02C 7/052; F05D 2260/607; Y02T 50/675; F04D 29/70; F04D 29/701
See application file for complete search history.

(56) References Cited

U.S. PATENT DOCUMENTS

| | | |
|---|---|---|
| 2,806,551 A | 9/1957 | Heinrich |
| 3,064,411 A | 11/1962 | Breslove, Jr. |

(Continued)

FOREIGN PATENT DOCUMENTS

| | | |
|---|---|---|
| EP | 0162441 A2 | 11/1985 |
| EP | 0227577 B1 | 1/1992 |

(Continued)

OTHER PUBLICATIONS

A European Search Report and Opinion issued in connection with Related EP Application No. 16193374.2 dated Feb. 16, 2017.

(Continued)

*Primary Examiner* — Richard Edgar
(74) *Attorney, Agent, or Firm* — General Electric Company; William Andes

(57) ABSTRACT

An engine component for a turbine engine includes a particle collector having a substrate configured to retain at least some particles from a particle-laden stream passing through a portion of the engine. A fluid bypass around the substrate of the collector enables the particle-laden stream to bypass the substrate if the substrate is filled with particles.

40 Claims, 10 Drawing Sheets

(51) Int. Cl.
*F02C 7/05* (2006.01)
*F02C 7/052* (2006.01)

(56) References Cited

U.S. PATENT DOCUMENTS

| | | |
|---|---|---|
| 3,274,757 A | 9/1966 | Wapler |
| 3,302,396 A | 2/1967 | Robbins |
| 3,309,867 A | 3/1967 | Enrich |
| 3,421,299 A | 1/1969 | Poplawski |
| 3,993,463 A | 11/1976 | Barr |
| 4,378,234 A | 3/1983 | Suzuki et al. |
| 4,527,387 A | 7/1985 | Lastrina et al. |
| 4,650,578 A | 3/1987 | Cerdan et al. |
| 4,685,942 A | 8/1987 | Klassen et al. |
| 4,820,122 A | 4/1989 | Hall et al. |
| 4,820,123 A | 4/1989 | Hall |
| 4,992,025 A | 2/1991 | Stroud et al. |
| 5,062,768 A | 11/1991 | Marriage |
| 5,135,354 A | 8/1992 | Novotny |
| 5,193,975 A | 3/1993 | Bird et al. |
| 5,279,109 A | 1/1994 | Liu et al. |
| 5,348,571 A | 9/1994 | Weber |
| 5,498,273 A | 3/1996 | Mann |
| 5,538,394 A | 7/1996 | Inomata et al. |
| 5,558,496 A | 9/1996 | Woodmansee et al. |
| 5,700,131 A | 12/1997 | Hall et al. |
| 5,788,741 A | 8/1998 | Burton et al. |
| 5,827,043 A | 10/1998 | Fukuda et al. |
| 5,857,833 A | 1/1999 | Dev |
| 5,918,458 A | 7/1999 | Coffinberry et al. |
| 5,951,250 A | 9/1999 | Suenaga et al. |
| 6,033,181 A | 3/2000 | Endres et al. |
| 6,039,537 A | 3/2000 | Scheurlen |
| 6,151,881 A | 11/2000 | Ai et al. |
| 6,164,913 A | 12/2000 | Reddy |
| 6,238,183 B1 | 5/2001 | Williamson et al. |
| 6,238,459 B1 | 5/2001 | Downs |
| 6,261,053 B1 | 7/2001 | Anderson et al. |
| 6,264,428 B1 | 7/2001 | Dailey et al. |
| 6,277,278 B1 | 8/2001 | Conrad et al. |
| 6,318,960 B1 | 11/2001 | Kuwabara et al. |
| 6,318,963 B1 | 11/2001 | Emery et al. |
| 6,368,060 B1 | 4/2002 | Fehrenbach et al. |
| 6,382,906 B1 | 5/2002 | Brassfield et al. |
| 6,413,044 B1 | 7/2002 | Roeloffs et al. |
| 6,527,829 B1 | 3/2003 | Malkamaeki et al. |
| 6,673,133 B2 | 1/2004 | Sechrist et al. |
| 6,698,180 B2 | 3/2004 | Snyder |
| 6,797,026 B2 | 9/2004 | Sechrist et al. |
| 6,840,737 B2 | 1/2005 | Flatman |
| 6,875,256 B2 | 4/2005 | Gillingham et al. |
| 6,910,370 B2 | 6/2005 | Clark et al. |
| 6,969,237 B2 | 11/2005 | Hudson |
| 7,048,501 B2 | 5/2006 | Katayama et al. |
| 7,052,532 B1 | 5/2006 | Liu et al. |
| 7,080,972 B2 | 7/2006 | Rawlinson |
| 7,097,419 B2 | 8/2006 | Lee et al. |
| 7,128,533 B2 | 10/2006 | Liang |
| 7,137,777 B2 | 11/2006 | Fried et al. |
| 7,244,101 B2 | 7/2007 | Lee et al. |
| 7,284,953 B2 | 10/2007 | Silverman et al. |
| 7,540,712 B1 | 6/2009 | Liang |
| 7,563,073 B1 | 7/2009 | Liang |
| 7,572,102 B1 | 8/2009 | Liang |
| 7,581,397 B2 | 9/2009 | Strangman et al. |
| 7,582,145 B2 | 9/2009 | Krigmont |
| 7,645,122 B1 | 1/2010 | Liang |
| 7,665,965 B1 | 2/2010 | Liang |
| 7,770,375 B2 | 8/2010 | Alvanos et al. |
| 7,874,158 B2 | 1/2011 | O'Neill et al. |
| 7,879,123 B2 | 2/2011 | Lundquist et al. |
| 7,921,654 B1 | 4/2011 | Liang |
| 7,922,784 B2 | 4/2011 | Saeed et al. |
| 7,934,906 B2 | 5/2011 | Gu et al. |
| 7,955,053 B1 | 6/2011 | Liang |
| 7,967,554 B2 | 6/2011 | Bremer |
| 7,976,277 B2 | 7/2011 | Kopmels et al. |
| 8,092,145 B2 | 1/2012 | Martel et al. |
| 8,104,362 B2 | 1/2012 | McFarland et al. |
| 8,142,153 B1 | 3/2012 | Liang |
| 8,176,720 B2 | 5/2012 | Beeck |
| 8,240,121 B2 | 8/2012 | Hazzard et al. |
| 8,348,614 B2 | 1/2013 | Piggush et al. |
| 8,561,411 B2 | 10/2013 | DiBenedetto |
| 8,573,034 B2 | 11/2013 | Grant et al. |
| 8,626,467 B2 | 1/2014 | Fang |
| 8,672,629 B2 | 3/2014 | Botrel et al. |
| 8,733,185 B2 | 5/2014 | Solomon |
| 8,746,464 B2 | 6/2014 | Maier |
| 2002/0166200 A1 | 11/2002 | Conrad et al. |
| 2002/0182062 A1 | 12/2002 | Scimone |
| 2004/0197191 A1 | 10/2004 | Cunha et al. |
| 2004/0221720 A1 | 11/2004 | Anderson et al. |
| 2005/0118024 A1 | 6/2005 | Anguisola McFeat et al. |
| 2005/0129508 A1 | 6/2005 | Fried et al. |
| 2005/0214118 A1 | 9/2005 | Dodd |
| 2006/0073015 A1 | 4/2006 | Liang |
| 2006/0133923 A1 | 6/2006 | Paauwe et al. |
| 2006/0275118 A1 | 12/2006 | Lee |
| 2007/0048122 A1 | 3/2007 | Van Suetendael, IV et al. |
| 2007/0140848 A1 | 6/2007 | Charbonneau et al. |
| 2008/0041064 A1 | 2/2008 | Moore et al. |
| 2009/0060715 A1 | 3/2009 | Kopmels |
| 2009/0081024 A1 | 3/2009 | Tibbott |
| 2009/0126337 A1 | 5/2009 | Hazzard et al. |
| 2009/0155088 A1 | 6/2009 | Lee et al. |
| 2009/0202337 A1 | 8/2009 | Bosley et al. |
| 2009/0214329 A1 | 8/2009 | Joe et al. |
| 2009/0255230 A1 | 10/2009 | Mildner |
| 2009/0261208 A1 | 10/2009 | Belyew |
| 2010/0021308 A1 | 1/2010 | Rawlinson |
| 2010/0024370 A1 | 2/2010 | Jones et al. |
| 2010/0040480 A1 | 2/2010 | Webster et al. |
| 2010/0104422 A1* | 4/2010 | Martel .............. F02C 6/08 415/121.2 |
| 2010/0119377 A1 | 5/2010 | Tibbott et al. |
| 2010/0162682 A1 | 7/2010 | Lerg |
| 2010/0172762 A1 | 7/2010 | Rawlinson |
| 2010/0239409 A1 | 9/2010 | Draper |
| 2010/0247321 A1 | 9/2010 | Kulkarni et al. |
| 2010/0254801 A1 | 10/2010 | Tibbott |
| 2011/0016838 A1 | 1/2011 | Smithies et al. |
| 2011/0067378 A1 | 3/2011 | Tibbott et al. |
| 2011/0236188 A1 | 9/2011 | Knapp et al. |
| 2011/0247345 A1 | 10/2011 | Laurello et al. |
| 2011/0247347 A1 | 10/2011 | Ebert et al. |
| 2012/0070308 A1 | 3/2012 | Naik et al. |
| 2012/0207594 A1 | 8/2012 | Chanez et al. |
| 2012/0233973 A1 | 9/2012 | Sedillo |
| 2013/0223987 A1 | 8/2013 | Stafford et al. |
| 2014/0083116 A1 | 3/2014 | Crites et al. |
| 2014/0196437 A1 | 7/2014 | Schneider |
| 2014/0290254 A1 | 10/2014 | Manning et al. |

FOREIGN PATENT DOCUMENTS

| | | |
|---|---|---|
| EP | 0340149 B1 | 5/1993 |
| EP | 0924408 A3 | 5/2001 |
| EP | 0690202 B1 | 8/2001 |
| EP | 1267037 B1 | 7/2006 |
| EP | 2549078 A1 | 1/2013 |
| EP | 2405985 B1 | 8/2013 |
| EP | 2927428 A1 | 10/2015 |
| GB | 711304 A | 6/1954 |
| GB | 1070458 A | 6/1967 |
| GB | 1146262 A | 3/1969 |
| GB | 1412780 A | 11/1975 |
| GB | 2270481 A | 3/1994 |

(56) References Cited

FOREIGN PATENT DOCUMENTS

| WO | 2011006262 A1 | 1/2011 |
|---|---|---|
| WO | 2011115880 A1 | 9/2011 |

OTHER PUBLICATIONS

A U.S. Non-Final Office Action issued in connection with Related U.S. Appl. No. 14/715,700 dated Apr. 5, 2017.
A PCT Search Report and Written Opinion issued in connection with related PCT Application No. PCT/US2015/033180 dated Mar. 1, 2016.
A PCT Search Report and Written Opinion issued in connection with related PCT Application No. PCT/US2015/032855 dated Mar. 14, 2016.
A European Search Report and Opinion issued in connection with corresponding EP Application No. EP15191609 dated Mar. 18, 2016.
A European Search Report and Opinion issued in connection with related EP Application No. 15190287.1 dated Mar. 4, 2016.
Sennett, "Air Filtration: Perfect Air Filtering for Gas Turbines." Filtration & Separation, vol. 44, Issue 10, Dec. 2007, pp. 20-22.
A European Search Report and Opinion issued in connection with related EP Application No. EP15191609 dated Mar. 16, 2016.
U.S. Appl. No. 62/004,736, filed May 29, 2014, John Howard Starkweather et al.
U.S. Appl. No. 62/004,728, filed May 29, 2014, John Howard Starkweather et al.
U.S. Appl. No. 62/004,764, filed May 29, 2014, Gregory Michael Laskowski et al.
U.S. Appl. No. 62/004,763, filed May 29, 2014, Gregory Michael Laskowski et al.
U.S. Appl. No. 62/004,768, filed May 29, 2014, Gregory Michael Laskowski et al.
U.S. Appl. No. 14/715,700, filed May 19, 2015, Robert Carl Murray et al.
U.S. Appl. No. 62/004,710, filed May 29, 2014, Robert Carl Murray et al.
U.S. Appl. No. 14/713,119, filed May 15, 2015, Victor Hugo Silva Correia et al.
U.S. Appl. No. 14/867,379, filed Sep. 28, 2015, Corey Bourassa et al.
U.S. Appl. No. 62/073,538, filed Oct. 31, 2014, Jared Peter Buhler et al.
A PCT Search Report and Written Opinion issued in connection with related PCT Application No. PCT/US2015/033108 dated Jul. 12, 2016.
Poplawski et al., "Microscopic Particle Separation and Applications", Aerospace Research Laboratories, 20 Years of Research Progress, Accession No. AD0667557, Project No. 7116, pp. 1-67, Feb. 1968.
Walsh et al., "Effects of Sand Ingestion on the Blockage of Film-Cooling Holes", Proceedings of GT2006, ASME Turbo Expo 2006: Power for Land, Sea and Air, Barcelona, Spain, vol. No. 3, pp. 81-90, May 8-11, 2006.
Musgrove et al., "Computational Design of a Louver Particle Separator for Gas Turbine Engines", Proceedings of ASME Turbo Expo 2009: Power for Land, Sea and Air, GT2009, Orlando, Florida, USA, vol. No. 3, pp. 1313-1323, Jun. 8-12, 2009.
Cardwell et al., "Investigation of Sand Blocking Within Impingement and Film-Cooling Holes", Journal of Turbomachinery, Transactions of the ASME, vol. No. 132, Issue No. 2, pp. 021020-1-021020-10, Apr. 2010.
Filippone et al., "Turboshaft Engine Air Particle Separation", Progress in Aerospace Sciences, vol. No. 46, Issue No. 5-6, pp. 224-245, Jul.-Aug. 2010.
Lawson et al., "Simulations of Multiphase Particle Deposition on Endwall Film-Cooling Holes in Transverse Trenches", Journal of Turbomachinery, Transactions of the ASME, vol. No. 134, pp. 051040-1-051040-10, Sep. 2012.
Lawson et al., "Simulations of Multiphase Particle Deposition on a Showerhead With Staggered Film-Cooling Holes", Journal of Turbomachinery, Transactions of the ASME, vol. No. 134, pp. 051041-1-051041-12, Sep. 2012.
A European Search Report and Opinion issued in connection with corresponding EP Application No. 15169688.7 dated Oct. 27, 2015.

* cited by examiner

ENGINE COMPONENT FOR A TURBINE ENGINE

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Typically, cooling is accomplished by ducting cooler air from the high and/or low pressure compressors to the engine components which require cooling. Temperatures in the high pressure turbine are around 1000° C. to 2000° C. and the cooling air from the compressor is about 500° C. to 700° C. While the compressor air is a high temperature, it is cooler relative to the turbine air, and may be used to cool the turbine. When cooling the turbines, cooling air may be supplied to various turbine components, including the interior of the turbine blades and the turbine shroud.

Particles, such as dirt, dust, sand, and other environmental contaminants, in the cooling air can cause a loss of cooling and reduced operational time or "time-on-wing" for the aircraft environment. This problem is exacerbated in certain operating environments around the globe where turbine engines are exposed to significant amounts of airborne particles. Particles supplied to the turbine components can clog, obstruct, or coat the flow passages and surfaces of the components, which can reduce the lifespan of the components. Turbine shrouds can have particulate accumulation on backside cooling surfaces, causing reduction in part life. In some cases the entire cooling surface of the shroud becomes coated with particles, with the additional negative impact of film hole blockage.

BRIEF DESCRIPTION OF THE INVENTION

In one aspect, the invention relates to an engine component for a turbine engine generating a fluid stream, having a particle separator having an inlet receiving the fluid stream, a scavenge outlet emitting a particle-laden stream, and a separator outlet emitting a reduced-particle stream, a particle collector in fluid communication with the scavenge outlet and comprising a substrate configured to retain at least some of the particles from the particle-laden stream, and a bypass passage fluidly coupled to the particle-laden stream and defining a fluid bypass around the substrate downstream of the scavenge outlet. At least a portion of the particle-laden stream contacts the substrate which retains at least some of the particles and as the substrate fills with particles, the particle-laden stream can bypass the substrate via the bypass passage.

In another aspect, the invention relates to an engine component for a turbine engine generating a particle-laden fluid stream, having a particle collector in fluid communication with the particle-laden fluid stream and comprising a substrate configured to retain at least some of the particles from the particle-laden fluid stream, and a bypass passage fluidly coupled to the particle-laden fluid stream and defining a fluid bypass around the substrate. At least a portion of the particle-laden fluid stream contacts the substrate which retains at least some of the particles, and as the substrate fills with particles, the particle-laden fluid stream can bypass the substrate via the bypass passage.

DESCRIPTION OF EMBODIMENTS OF THE INVENTION

Figure 1:
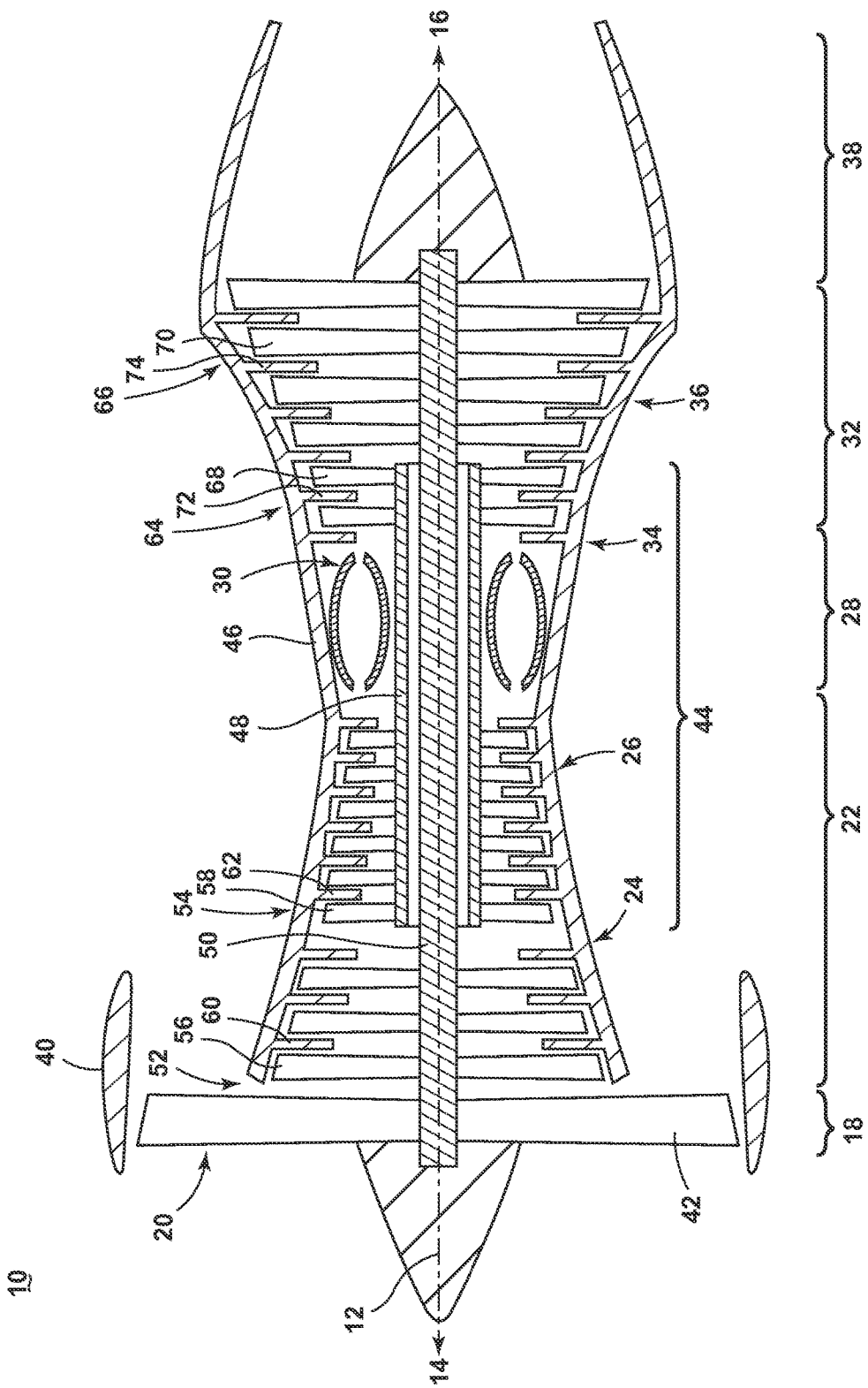
FIG. 1 is a schematic cross-sectional diagram of a gas turbine engine for an aircraft.

The described embodiments of the present invention are directed to systems, methods, and other devices related to particle separation, particularly in a turbine engine, and more particularly to particle separation for the removal of particles from a cooling air flow in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. This air is often referred to as bypass air, which is one form of a cooling fluid when used to cool. In the context of a turbine engine, the hot portions of the engine are normally downstream of the combustor 30, especially the turbine section 32, with the HP turbine 34 being the hottest portion as it is directly downstream of the combustor section 28. Other portions of the aircraft, not part of the engine, may be considered a hot portion that is to be cooled.

Figure 2:
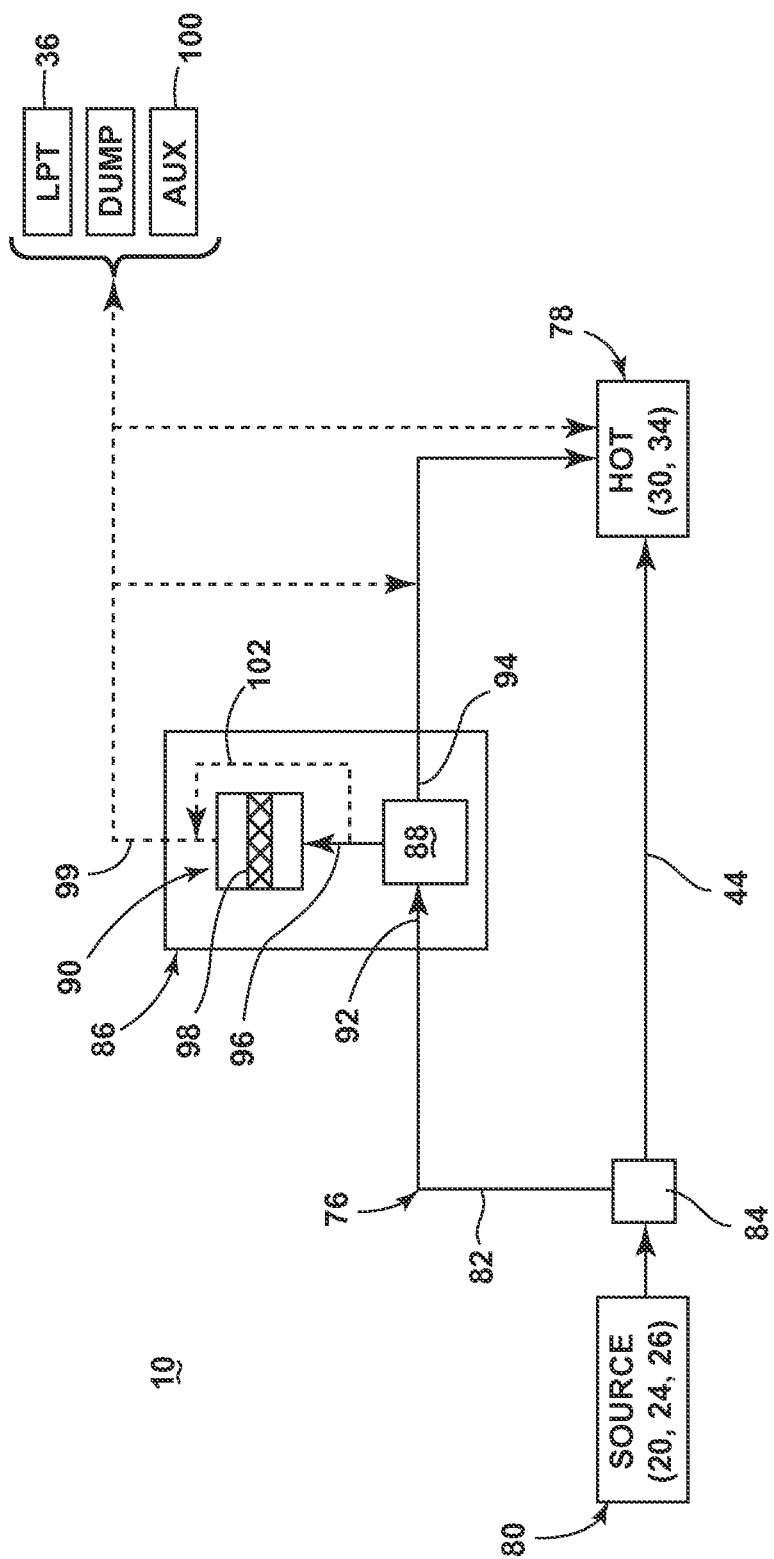
FIG. 2 is a schematic view showing a bypass cooling circuit for the engine of FIG. 1 having a generic engine component according to a first embodiment of the invention.

FIG. 2 is a schematic view showing a portion of the engine 10 from FIG. 1. The engine 10 can further include a cooling circuit 76 for providing cooling fluid to at least one hot portion 78 of the engine 10 during operation. In order to cool the hot portion 78 of the engine, the cooling fluid is at a temperature that is less than the operational temperature of the hot portion 78; i.e. the temperature of the hot portion 78 during normal operation of the engine 10. As indicated in FIG. 2, the hot portion 78 of the engine 10 may include, but is not limited to, the HP turbine 34 and the walls of the combustor 30. A source of cooling fluid 80 entering the cooling circuit 76 may be, but is not limited to, fluid discharged from the fan 20, the LP compressor 24, or the HP compressor 26.

The cooling circuit 76 includes a conduit 82 which bypasses at least a portion of the core 44 of the engine 10 in order to provide cooling fluid to the hot portion 78 of the engine 10. Air may enter the conduit 82 from the source of cooling fluid 80, and may exit the conduit 82 at the hot portion 78 of the engine 10 to which the cooling fluid is to be supplied.

In one configuration, the cooling circuit 76 can include a flow divider 84 which separates the fluid stream from the source of cooling fluid 80 into a core fluid stream which enters the core 44 and a bypass fluid stream which enters the conduit 82. In one configuration, the flow divider 84 can be located between fan blades 42 and the LP compressor 24 (FIG. 1), with the core fluid stream entering the LP compressor 24 and the surrounding bypass fluid stream entering the conduit 82. However, the location of the flow divider 84 can vary depending on the source of cooling fluid 80.

The cooling circuit 76 may include an engine component 86 having a particle separator 88 for separating particles, which may include, but is not limited to, dirt, dust, debris, and other contaminants, from the cooling fluid stream from the source prior to being supplied to the hot portion of the engine 10, and a particle collector 90 for retaining at least some of the particles from the particle-laden stream. The engine component 86 may define a portion of the conduit 82, and may be located anywhere along the conduit 82. Some non-limiting examples of the engine component 86 include an inducer assembly, a shroud, a combustor liner, a nozzle, a blade, a vane, an impeller, or a compressor bleed port.

The particle separator 88 may, for example, be an inertial separator which separates particles from the cooling air flow using a combination of forces, such as centrifugal, gravitational, and inertial. More specifically, the inertial separator may be a centrifugal or cyclonic separator, which uses cyclonic action to separate particles from the cooling air flow. Some examples of particle separators are disclosed in U.S. Provisional Application No. 62/004,736, filed May 29, 2013, which is incorporated herein by reference in its entirety.

The particle separator 88 includes a separator inlet 92, a separator outlet 94, and a scavenge outlet 96. The cooling fluid stream entering the particle separator 88 at the separator inlet 92 is separated into a particle-laden stream which contains at least some of the particles from the cooling fluid stream, and a reduced-particle stream which contains fewer or a lower concentration of particles than the concentrated-particle stream. The reduced-particle stream exits the particle separator 88 via the separator outlet 94, and is provided to the hot portion 78 of the engine 10 for cooling.

The scavenge outlet 96 is coupled with the particle collector 90 to collect at least some of the separated particles from the particle-laden stream that exits the particle separator 88. The particle collector 90 can include a substrate 98 configured to retain at least some of the particles from the particle-laden stream. The substrate 98 can be an air-permeable, porous substrate, such as a filter, through which the particle-laden stream flows. Some non-limiting examples of an air-permeable, porous substrate 98 include a filter media of wire mesh, ceramic, ceramic foam, metal, or metallic foam. In another configuration, the substrate 98 can be a particle entrapment substrate upon which the particle-laden stream impinges. Some non-limiting examples of a particle entrapment substrate include honeycomb or bristles. The substrate 98 can be an accessible unit that can be periodically serviced, such as by cleaning or replacing the substrate 98 during an engine overhaul.

After collection, the fluid stream emitted by an outlet 99 of the particle collector 90 may be utilized in another portion of the engine 10, or may be exhausted from the engine 10. For example, the fluid stream from the particle collector 90 may be supplied to the hot portion 78 of the engine 10 for cooling. The fluid stream from the particle collector 90 may be supplied separately from the reduced-particle stream from the particle separator 88, or may be combined with the reduced-particle stream somewhere upstream of the hot portion 78, including, but not limited to, at the separator outlet 94. In another example, the fluid stream from the particle collector 90 may be used for cooling or purging the LP turbine 36, dumped from the engine 10, or used for some auxiliary function 100, including being supplied to an inlet guide vane, a nose cone, or an anti-icing system of the engine 10.

The engine component 86 further includes a bypass passage 102 fluidly coupled to the particle-laden stream and defining a fluid bypass around the substrate 98 downstream of the scavenge outlet 96. In operation, at least a portion of the particle-laden stream contacts the substrate 98. As the substrate 98 fills with particles, the particle-laden stream can bypass the substrate 98 via the bypass passage 102, preventing air flow through the engine component 86 from becoming restricted. In one non-limiting embodiment, the bypass passage 102 may couple with the outlet 99 of the particle collector 90 downstream of the substrate 98.

Figure 3:
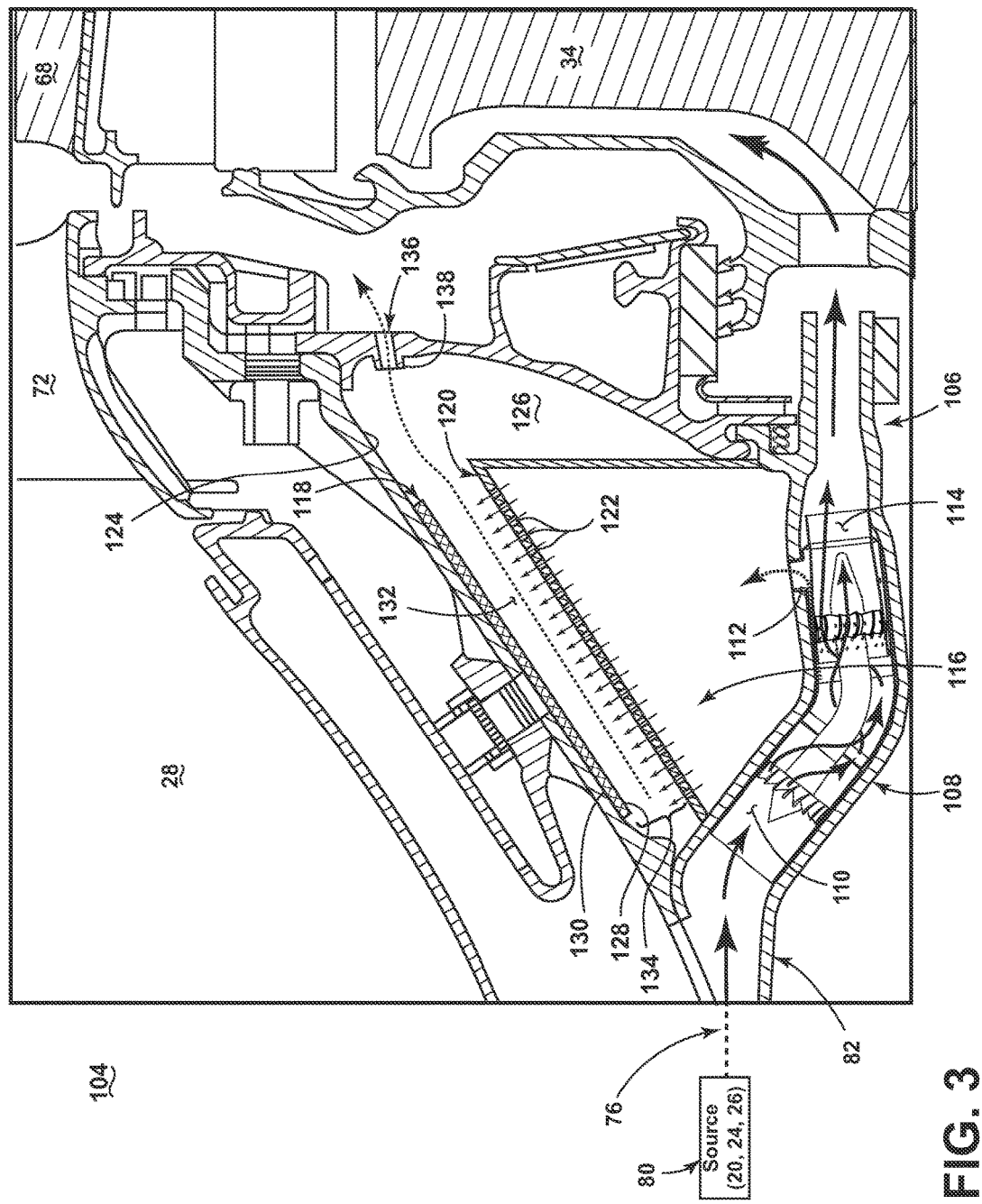
FIG. 3 is a schematic view showing an engine component for the engine from FIG. 1 according to a second embodiment of the invention.

FIG. 3 is a schematic view showing an engine component 104 of the engine 10 from FIG. 1 according to a second embodiment of the invention. The engine component 104 includes an inducer assembly 106, which injects a cooling fluid stream into the HP turbine 34. The inducer assembly 106 accelerates the cooling fluid stream and also turns the cooling fluid stream from a substantially axial direction parallel to the centerline 12 of the engine 10 to a generally tangential direction, so as to tangentially inject the cooling fluid stream into the rotating blades 68 at a rotational or tangential speed and direction substantially equal to that of the blades 68. By "generally tangential", the cooling fluid stream may be oriented at a slightly shallow angle with respect to a true tangential direction.

The engine component 104 includes a particle separator 108 having an inlet 110 receiving the fluid stream, a scavenge outlet 112 emitting a particle-laden stream, and a separator outlet 114 emitting a reduced-particle stream. The separator outlet 114 can fluidly communicate with the inducer assembly 106 to provide the reduced-particle stream to the HP turbine 34. The particle separator 108 shown herein is for illustrative purposes only, and other types of particle separators are possible; for example, any of the particle separators disclosed in U.S. Provisional Application No. 62/004,736 may be used with the engine component 104.

The engine component 104 further includes a particle collector 116 in fluid communication with the scavenge outlet 112. The particle collector 116 includes a substrate 118 configured to retain at least some of the particles from the particle-laden stream. In the illustrated embodiment, the substrate 118 is a particle entrapment substrate upon which the particle-laden stream impinges. Some non-limiting examples of the particle entrapment substrate include honeycomb or bristles. The substrate 118 further can be an accessible unit that can be periodically serviced, such as by cleaning or replacing the substrate 118 during an engine overhaul.

The particle collector 116 further includes a baffle 120 between the scavenge outlet 112 and the substrate 118. The baffle 120 has at least one impingement aperture 122 through which the particle-laden stream passes before contact with the substrate 118. The impingement aperture 122 can be oriented normal to a surface of the substrate 118 confronting the baffle 120, as shown in FIG. 3, or can be oriented at a non-orthogonal angle to the surface.

The engine component 104 can include a wall 124, which may be a peripheral wall, defining an interior chamber 126, with the substrate 118 and baffle 120 provided within the interior chamber 126. In the present embodiment, the substrate 118 comprises a first surface 128 confronting the baffle 120 and a second surface 130 confronting the wall 124. In operation, the particle-laden stream emitted from the scavenge outlet 112 can impinge on the first surface 128 of the substrate 118, with at least some of the particles becoming entrapped in the substrate 118.

The engine component 104 further includes a bypass passage 132 fluidly coupled to the particle-laden stream and defining a fluid bypass around the substrate 118 downstream of the scavenge outlet 112. As the particle-laden stream exits the scavenge outlet 112, at least a portion of the particle-laden stream contacts the substrate 118, which can retain at least some of the particles in the particle-laden stream. However, as the substrate 118 fills with particles, the particle-laden stream can bypass the substrate 118 via the bypass passage 132. This maintains air flow through the baffle 120 of the particle collector 116 without restriction.

The bypass passage 132 can be at least partially defined between the baffle 120 and the substrate 118. As shown, the bypass passage 132 is partially defined by a space 134 between the baffle 120 and the first surface 128 of the substrate 118 and partially defined by the interior chamber 126 defined by the wall 124.

The engine component 104 is further provided with an exit for the scavenge flow, whether the scavenge flow comprises the fluid stream exiting the substrate 118 or the bypass stream from the bypass passage 132. The exit can comprise a purge hole 136 in the wall 124. The purge hole 136 can extend at a non-orthogonal angle relative to the wall 124 surrounding the purge hole 136. Further, the purge hole 136 can have a raised edge 138 extending from the wall 124 into the interior chamber 126. The angled purge hole 136 and the raised edge 138 can further decrease the number of particles which leave the engine component 104.

Figure 4:
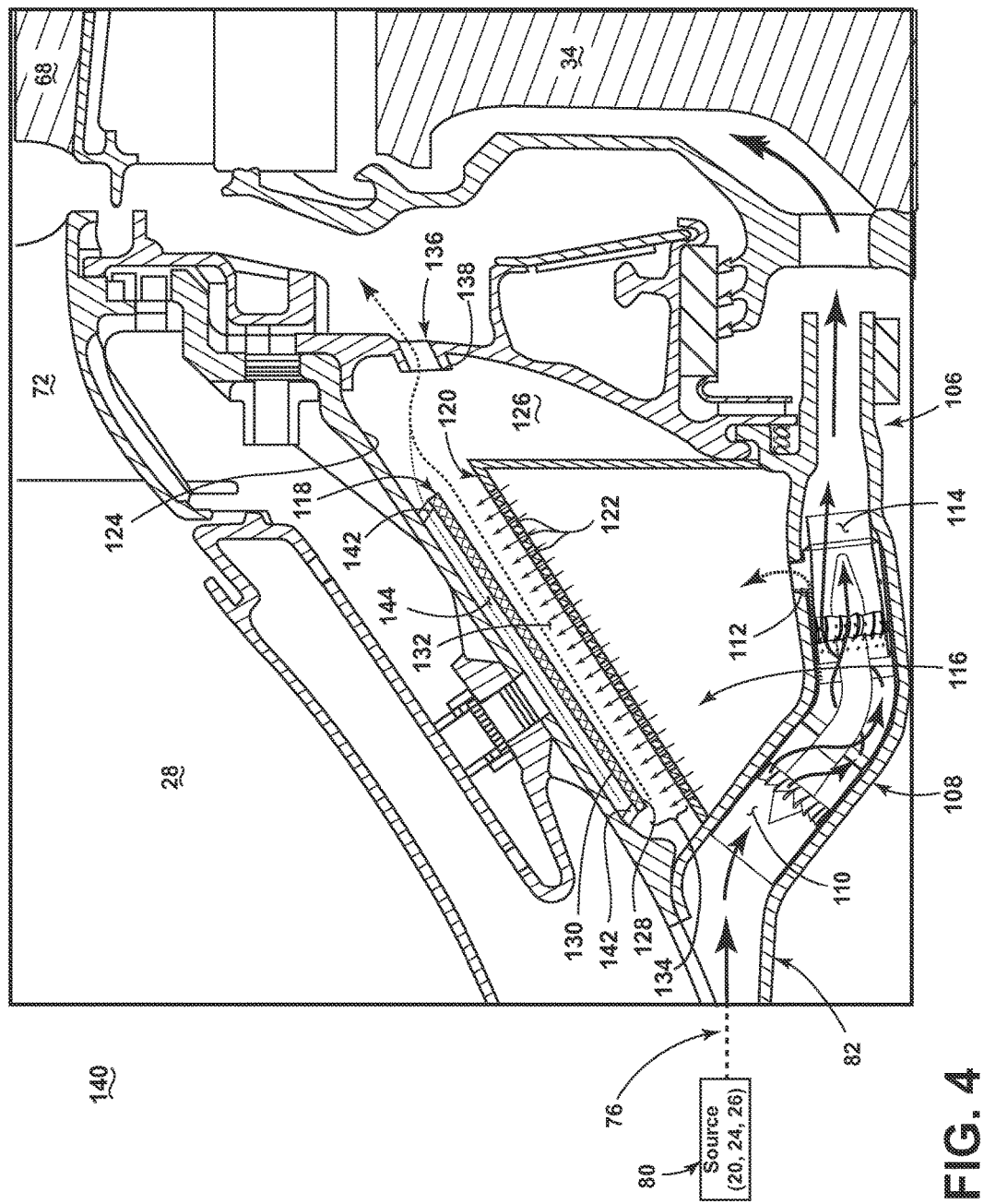
FIG. 4 is a schematic view showing an engine component for the engine from FIG. 1 according to a third embodiment of the invention.

FIG. 4 is a schematic view showing an engine component 140 for the engine from FIG. 1 according to a third embodiment of the invention. The third embodiment is substantially similar to the second embodiment, and like elements are referred to by the same reference numerals. The third embodiment differs from the second by the provision of a substrate 118 comprising an air-permeable, porous substrate, such as a filter, through which the particle-laden stream flows. Some non-limiting examples of an air-permeable, porous substrate 118 include a filter media of wire mesh, ceramic, ceramic foam, metal, or metallic foam.

The first surface 128 of the substrate 118 defines an upstream surface of the substrate 118, and confronts the particle-laden stream emitted from the scavenge outlet 112. The second surface 130 defines a downstream surface of the substrate 118. In operation, the particle-laden stream emitted from the scavenge outlet 112 can flow through the substrate 118 from the upstream surface 128 to the downstream surface 130. Alternatively, the substrate 118 can be configured such that some or all of the particle-laden stream traverses along the length of the substrate 118 to exit through an end of the substrate 118.

A standoff 142 is provided between the second surface 130 of the substrate 118 and the wall 124 of the engine component 104 to define a space 144 there between. The space 144 can define an air flow path between the substrate 118 and the wall 124 for air that has passed through the substrate 118. The space 144 is open to the purge hole 136.

Figure 5:
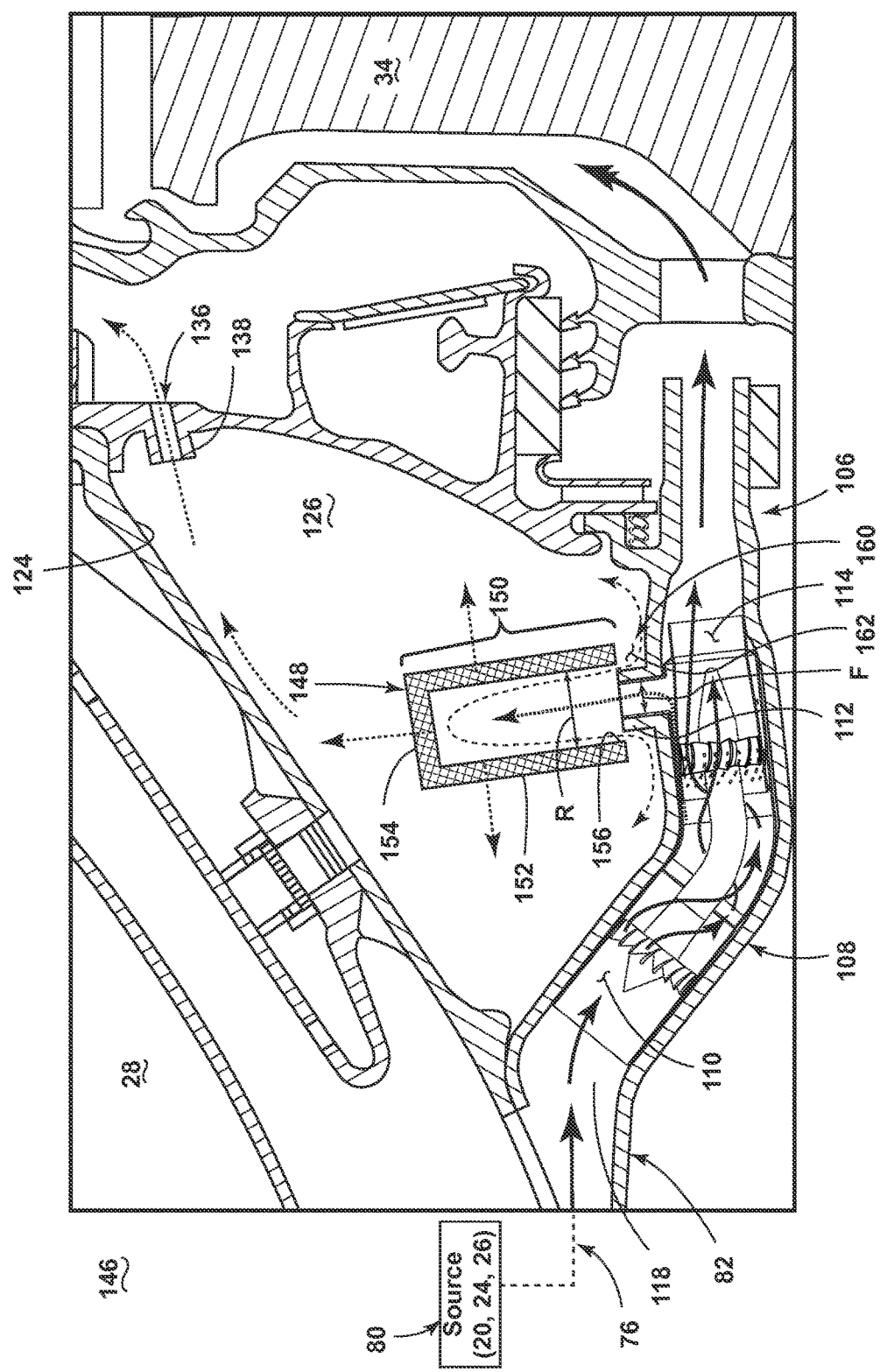
FIG. 5 is a schematic view showing an engine component for the engine from FIG. 1 according to a fourth embodiment of the invention.

FIG. 5 is a schematic view showing an engine component 146 according to a fourth embodiment of the invention. The fourth embodiment is similar to the second embodiment, and like elements are referred to by the same reference numerals. The fourth embodiment differs from the previous embodiments in the configuration of the particle collector. In FIG. 5, the engine component 146 includes a particle collector 148 having a body 150 in fluid communication with the scavenge outlet 112. At least a portion of the body 150 can comprise an air-permeable, porous substrate. In one example, the body 150 can comprise a removable or replaceable canister or frame which supports the porous substrate. The body 150 can partially surround the scavenge outlet 112 or can be offset from the scavenge outlet 112 as shown in FIG. 5.

In the illustrated embodiment, the entire body 150 comprises the porous substrate, and the body 150 is generally cylindrical, with a peripheral wall 152 surrounding the scavenge outlet 112, a closed end wall 154 confronting the scavenge outlet 112 and an open end wall defining a receiving opening 156 opposite the closed end wall 154. The receiving opening 156 may be at offset from and at least partially aligned with the scavenge outlet 112 for introducing the particle-laden stream from the particle separator 108 into the body 150. The particle-laden airstream emitted from the scavenge outlet 112 flows into the receiving opening 156 and through the body 150 from an upstream surface defined by the interior of the walls 152, 154 to a downstream surface defined by the exterior of the walls 152, 154.

As shown herein, the body 150 is generally cylindrical and defines a circular receiving opening 156. Other profiles for the body 150 and receiving opening are possible, including the body 150 defining a tapered or curved receiving opening 156. In one example, the receiving opening 156 can be conical, with the larger diameter of the conical shape facing the scavenge outlet 112.

The engine component 146 further includes a bypass passage 160 fluidly coupled to the particle-laden stream and defining a fluid bypass around the body 150. In the present embodiment, in which the body 150 is offset from the scavenge outlet 112, the bypass passage 160 is at least partially defined by an opening 162 between the open end wall of the body 150 defining the receiving opening 156 and the scavenge outlet 112. In an embodiment in which the body 150 at least partially surrounds the scavenge outlet 112, the opening 162 may be annular and may extend circumferentially between the scavenge outlet 112 and the receiving opening 156. In yet another embodiment, the opening 162 can be provided in the scavenge outlet 112 itself.

As the body 150 fills with particles, at least some of the particle-laden stream from the scavenge outlet 112 can bypass the particle collector 148 via the bypass passage 160, preventing air flow through the engine component 146 from becoming restricted. In this embodiment, particle bypass may be dependent on size; larger particles may still be carried into the particle collector 148 by inertia, while smaller particles may turn with the fluid stream into the bypass passage 160.

For the embodiment shown herein, the scavenge outlet 112 can define a feed diameter F and the receiving opening 156 can define a receiving diameter R. In one non-limiting example, the feed diameter F of the scavenge outlet 112 can range from 0.1" to 0.25".

The ratio of the feed diameter F to the receiving diameter R effects the collection efficiency of the particle collector 148; a ratio that is too large, i.e. where the feed diameter F is significantly larger than the receiving diameter R, will have less efficient collection because the particle-laden stream will tend to bypass the body 150, even before the particle collector 148 begins to fill with particles, and not enter the receiving opening 156. Similarly, inefficient collection can occur at the other extreme in which the ratio is too small, i.e. where the feed diameter F is significantly smaller than the receiving diameter R, because the particle-laden stream will tend to rebound off the interior of the body 150, rather than passing through the body 150. Particle collection may be most efficient when the ratio of the receiving diameter R to the feed diameter F is 1:2 to 3:2.

The distance between the scavenge outlet 112 and the receiving opening 156 may also effect the collection efficiency of the particle collector 148. In one non-limiting example, the distance may be less than five times the feed diameter F, including a distance of zero as illustrated herein.

Other factors influencing particle collection efficiency are the dimensions of the filter body 150. In one non-limiting example, the depth of the body 150, i.e. the distance from the receiving opening 156 to the end wall 154, can be 4 to 20 times the feed diameter F, and the thickness of the filter substrate, i.e. the thickness of the peripheral wall 152 or end wall 154, can be 0.1 to 5 times the feed diameter F.

Figure 6:
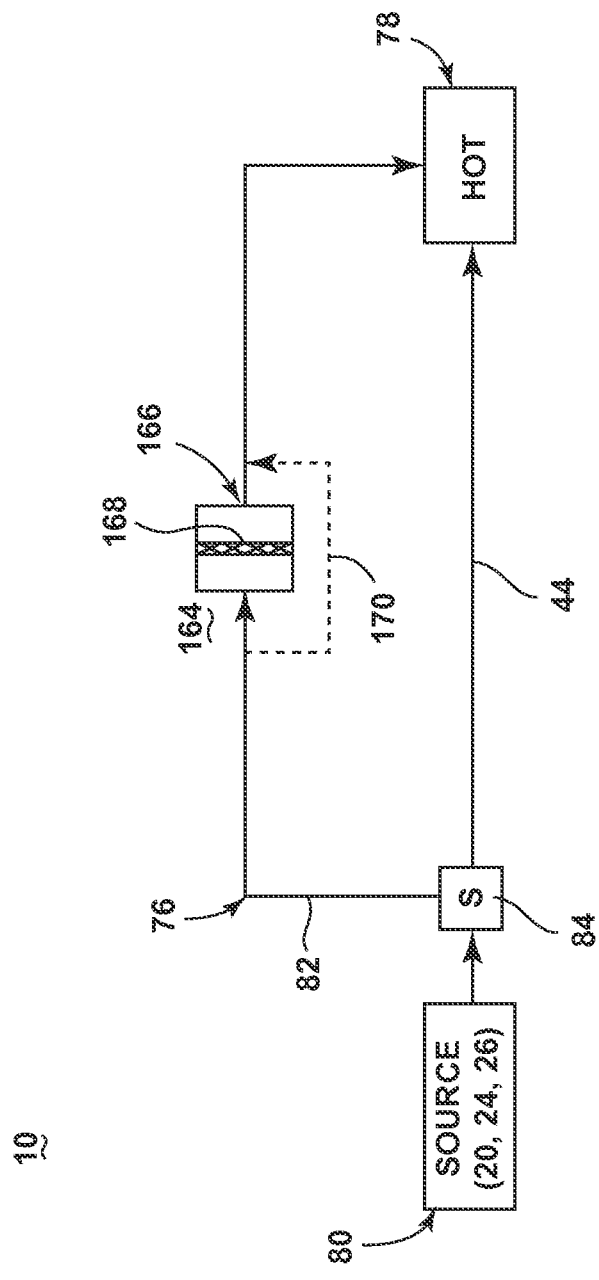
FIG. 6 is a schematic view showing a bypass cooling circuit for the engine of FIG. 1 having a generic engine component according to a fifth embodiment of the invention.

FIG. 6 is a schematic view showing a bypass cooling circuit for the engine of FIG. 1 having a generic engine component according to a fifth embodiment of the invention. The cooling circuit 76 of the fifth embodiment is substantially similar to the first embodiment shown in FIG. 2, and like elements are identified with the same reference numerals. The cooling circuit 76 differs from the cooling circuit 76 of FIG. 2 in that the cooling circuit 76 may include an engine component 164 having a particle collector 166, without an accompanying particle separator, for retaining at least some of the particles from the cooling fluid stream from the source prior to being supplied to the hot portion of the engine 10. The engine component 164 may define a portion of the conduit 82, and may be located anywhere along the conduit 82. Some non-limiting examples of the engine component 164 include an inducer assembly, a shroud, a combustor liner, a nozzle, a blade, a vane, an impeller, or a compressor bleed port.

The particle collector 166 can include a substrate 168 configured to retain at least some of the particles from the cooling fluid stream. The substrate 168 can be an air-permeable, porous substrate, such as a filter, through which the particle-laden stream flows. Some non-limiting examples of an air-permeable, porous substrate 168 include a filter media of wire mesh, ceramic, ceramic foam, metal, or metallic foam. In another configuration, the substrate 168 can be a particle entrapment substrate upon which the particle-laden stream impinges. Some non-limiting examples of a particle entrapment substrate include honeycomb or bristles. The substrate 168 can be an accessible unit that can be periodically serviced, such as by cleaning or replacing the substrate 168 during an engine overhaul.

The engine component 164 further includes a bypass passage 170 fluidly coupled to the cooling fluid stream and defining a fluid bypass around the substrate 168. In operation, at least a portion of the particle-laden stream contacts the substrate 168. As the substrate 168 fills with particles, the cooling fluid stream can bypass the substrate 168 via the bypass passage 170, preventing air flow through the engine component 164 from becoming restricted.

Figure 7:
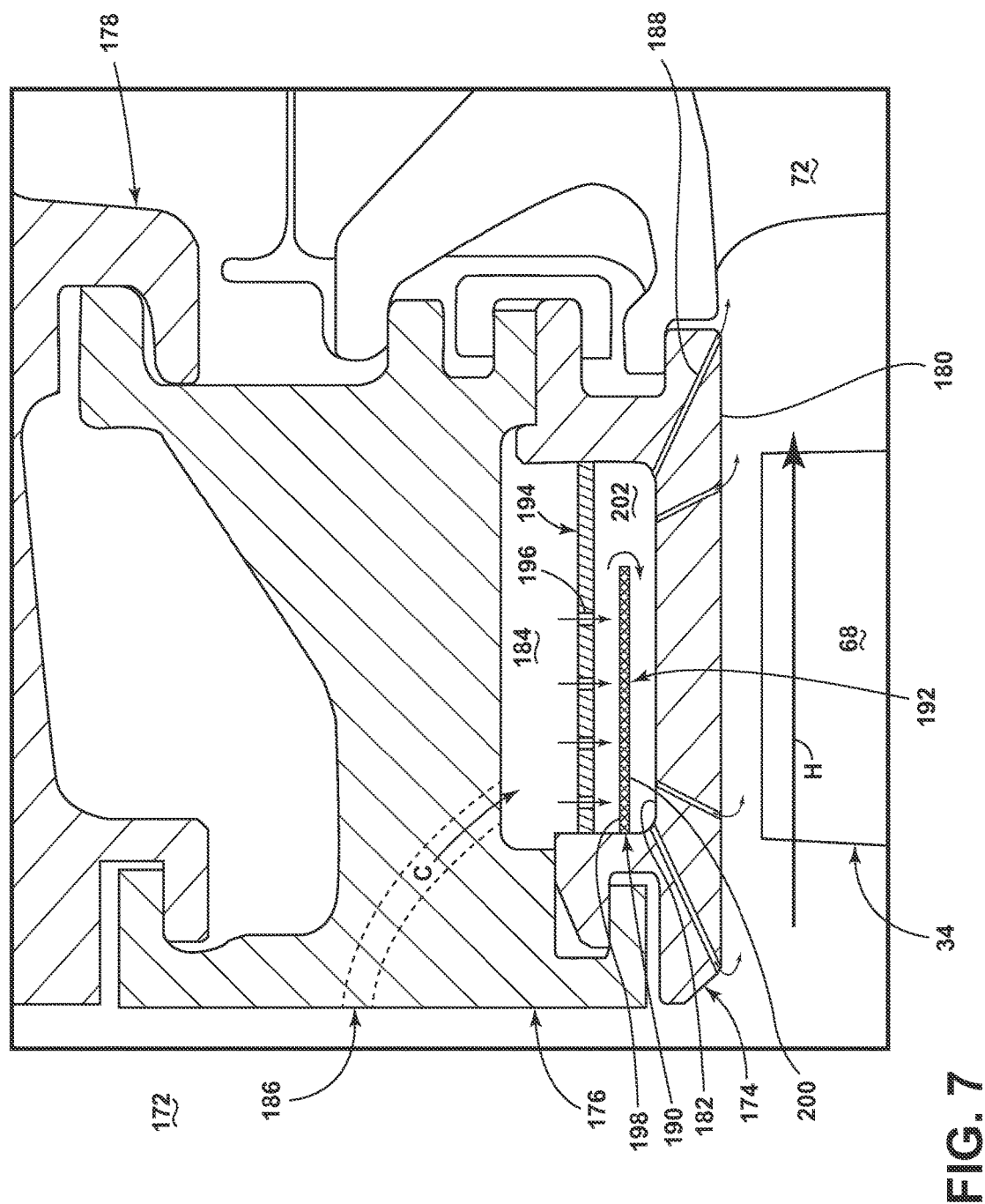
FIG. 7 is a schematic view showing an engine component for the engine from FIG. 1 according to a sixth embodiment of the invention.

FIG. 7 is a schematic view showing a shroud assembly 172 of the engine 10 from FIG. 1 according to first embodiment of the invention, which may be cooled by the cooling fluid. The shroud assembly 172 is shown as being associated with a blade 68 of the HP turbine 34, although the shroud assembly 172 can alternatively be associated with the LP turbine 36, the LP compressor 24, or the HP compressor 26.

The shroud assembly 172 includes a shroud 174 spaced radially about the blades 68 and a hanger 176 configured to couple the shroud 174 with a casing of the engine 10 and retain the shroud 174 in position, adjacent to the blade 68. The hanger 176 can directly mount the shroud 174 to the core casing 46 of the engine (see FIG. 1), or can indirectly couple the shroud 174 with the core casing 46 via a hanger support 178, as shown herein. The shroud 174 and hanger 176 extend circumferentially, and the engine 10 from FIG. 1 may include multiple shroud assemblies 172 extending around the circumference defined by the blades 68.

The shroud 174 has a hot surface 180 in thermal communication with a hot combustion gas flow H, such as heated gas emitted from the combustor 30, and a cooling surface 182. Here, the hot surface 180 confronts one of the blades 68 of the HP turbine 34 and the cooling surface 182 is opposite the hot surface 180. The cooling surface 182 at least partially defines interior 184 of the shroud 174. A cooling air inlet 186 to the interior 184 of the shroud 174 may extend through the hanger 176.

The shroud 174 can further comprise one or more film holes 188 that extend through at least a portion of the shroud 174 between the hot and cooling surfaces 180, 182. As illustrated, multiple film holes 188 are provided and extend radially to fluidly couple the interior 184 to an exterior of the shroud 174. Cooling fluid may pass out of the interior 184 via the film holes 188 to form a cooling film over some or all of the hot surface 180 of the shroud 174. The film holes 188 are typically forward or aft of the blades 68 because the fluid motion at the tip of the rotating blades 68 interferes with the fluid leaving the film holes 188 at the hot surface 180.

The shroud assembly 172 further includes a particle collector 190 within the interior 184 of the shroud 174. The particle collector 190 includes a substrate 192 configured to retain at least some of the particles from the particle-laden stream. In the illustrated embodiment, the substrate 192 is a particle entrapment substrate upon which the particle-laden stream impinges. Some non-limiting examples of the particle entrapment substrate include honeycomb or bristles. The substrate 192 further can be an accessible unit that can be periodically serviced, such as by cleaning or replacing the substrate 192 during an engine overhaul.

The particle collector 190 further includes a baffle 194 between the inlet 186 and the substrate 192. The baffle 194 overlies at least a portion of the shroud 174 and directs the cooling fluid flow C toward the substrate 192. The baffle 194 includes one or more impingement aperture(s) 196 through which the cooling fluid flow C passes and is directed toward the cooling surface 182 of the shroud 174. The impingement apertures 196 can be oriented normal to a surface of the substrate 192 confronting the baffle 194, as shown in FIG. 7, or can be oriented at a non-orthogonal angle to the surface.

In the present embodiment, the substrate 192 comprises a first surface 198 confronting the baffle 194 and a second surface 200 confronting the cooling surface 182 of the shroud 174. In operation, the cooling fluid stream C can impinge on the first surface 198 of the substrate 192, with at least of the particles becoming entrapped in the substrate 192.

The shroud assembly 172 further includes a bypass passage 202 fluidly coupled to the cooling fluid stream C and defining a fluid bypass around the substrate 192 downstream of the inlet 186. As the cooling fluid stream C passes through the baffle 194, at least a portion of the cooling fluid stream C contacts the substrate 192, which can retain at least some of the particles in the cooling fluid stream C. However, as the substrate 192 fills with particles, the cooling fluid stream C can bypass the substrate 192 via the bypass passage 202 and reach the film holes 188. This maintains air flow through the baffle 194 and shroud 174 without restriction.

The bypass passage 202 can be at least partially defined between the baffle 194 and the substrate 192. As shown, bypass passage 202 is partially defined by the space between the baffle 194 and the first surface 198 of the substrate 192 and partially defined by the space between the second surface 200 of the substrate 192 and the cooling surface 182 of the shroud 174.

Figure 8:
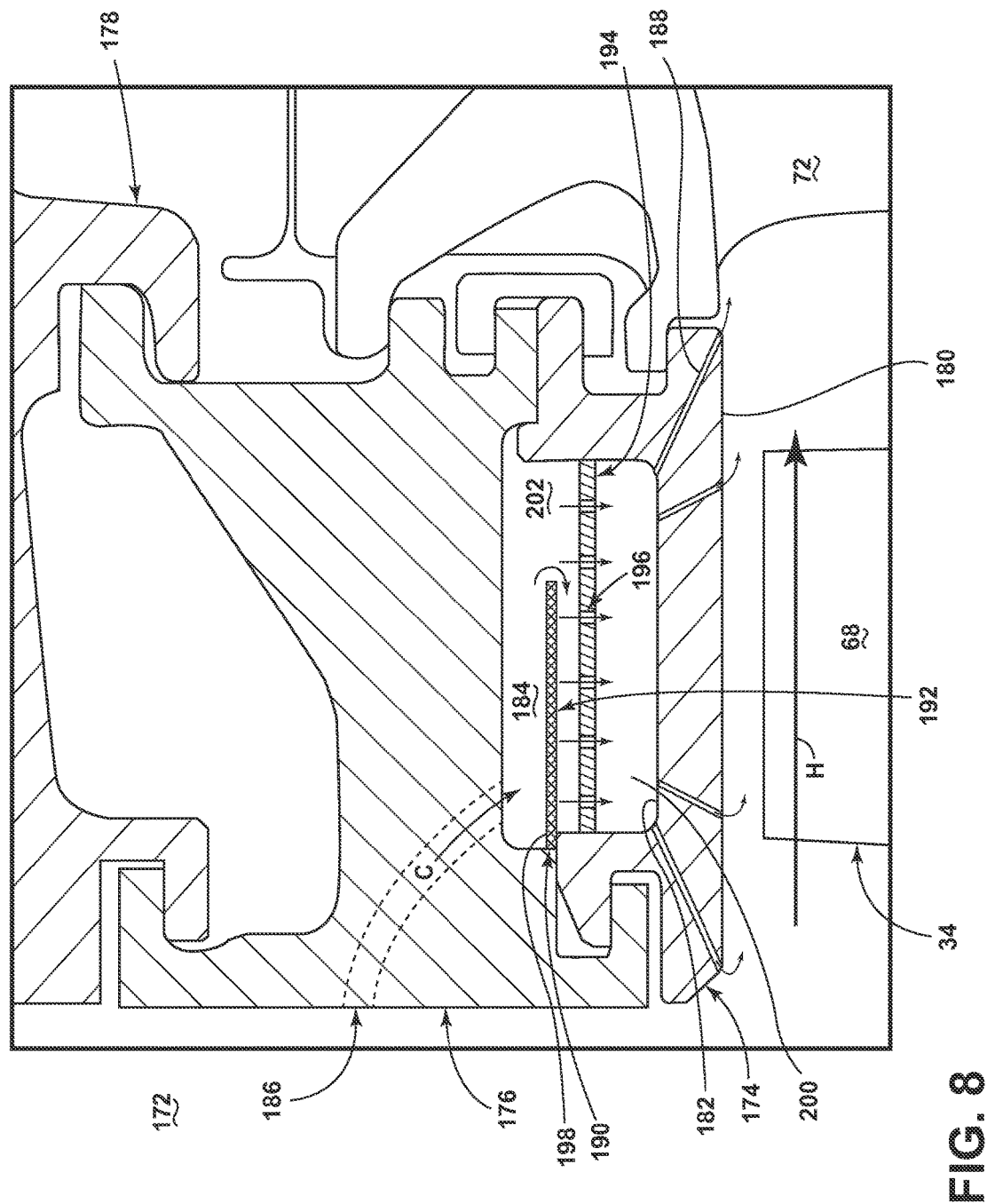
FIG. 8 is a schematic view showing an engine component for the engine from FIG. 1 according to a seventh embodiment of the invention.

FIG. 8 is a schematic view showing an engine component for the engine from FIG. 1 according to a seventh embodiment of the invention. The seventh embodiment is substantially similar to the sixth embodiment, and like elements are referred to with the same reference numerals. In the seventh embodiment, the substrate 192 is provided between the inlet 186 and the baffle 194. In operation, the cooling fluid stream C from the inlet 186 can impinge on or pass through the substrate 192, with at least of the particles becoming entrapped or filtered by the substrate 192. The baffle 194 then directs the fluid toward the cooling surface 182 of the shroud 174. As the substrate 192 fills with particles, the cooling fluid stream C can bypass the substrate 192 via the bypass passage 202 and reach the baffle 194. In this embodiment, the bypass passage 202 can be at least partially defined between the substrate 192 and the baffle 194. As shown, the bypass passage 202 is partially defined by the space between the hanger 176 and the first surface 198 of the substrate 192 and partially defined by the space between the second surface 200 of the substrate 192 and the baffle 194, as well as by the shroud 174.

Figure 9:
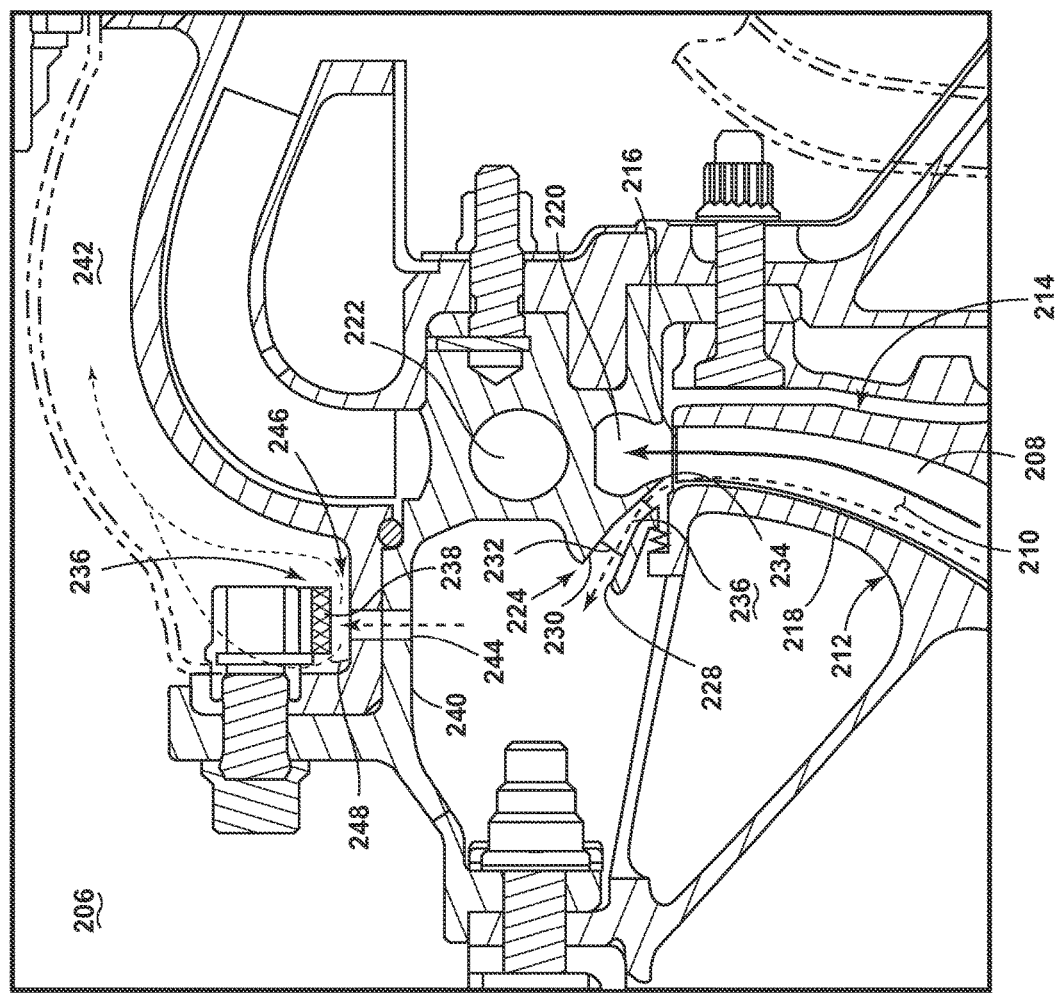
FIG. 9 is a schematic view showing an engine component for the engine from FIG. 1 according to an eighth embodiment of the invention.

FIG. 9 is a schematic view showing an engine component for the engine 10 from FIG. 1 according to an eighth embodiment of the invention. The engine component includes an impeller assembly 206 of a compressor, only a portion of which is shown in FIG. 9. The impeller assembly 206 includes a plurality of impeller blades 208, only one of which is shown in FIG. 9, within an annular impeller chamber 210 defined by an impeller shroud 212 and an impeller hub 214. The impeller blade 208 includes a leading edge (not shown), a trailing edge 216 and an outer tip 218. The trailing edge 216 is located at an outlet end of the impeller shroud 212 and the outer tip 218 follows the inner contour of the impeller shroud 212. An annular diffuser groove 220 is provided at the outlet end of the impeller shroud 212, and the air flow passes through a pipe diffuser 222 to communicate with the combustion chamber of the engine, as well as to provide cooling for the compressor assembly.

An impeller bleed 224 is provided at trailing edge 216 of the impeller blade 208 for bleeding fluid from the impeller chamber 210 to the exterior of the impeller shroud 212. The impeller bleed 224 is formed by an annular slot 226 defined between an upstream frusto-conical surface 228 and a downstream frusto-conical surface 230. Deswirl vanes 232 are provided in the annular slot 226 to remove the tangential velocity from the bleed fluid and turn the flow vector from predominantly swirling to predominantly axial before it exits the impeller bleed 224, thereby recovering pressure.

An extraction scoop 234 can be provided adjacent the trailing edge 214 of the impeller blade 208 to guide a portion of the fluid toward the impeller bleed 222 rather than to the diffuser groove 218. The impeller blades 208 naturally centrifuge particles toward the outer tip 218 and impeller shroud 212. Therefore the fluid separated by the extraction scoop 234 typically a higher concentration of particles than the fluid passing to the diffuser groove 218. Thus, the extraction scoop 234 can function as a particle separator for the impeller assembly 206, with the impeller bleed 224 emitting a particle-laden stream, and a reduced-particle stream being provided to the diffuser groove 218.

The impeller assembly 206 further includes a particle collector 236 in fluid communication with the impeller bleed 224. The particle collector 236 includes a substrate 238 configured to retain at least some of the particles from the particle-laden stream. In the illustrated embodiment, the substrate 238 is a particle entrapment substrate upon which the particle-laden stream impinges. Some non-limiting examples of the particle entrapment substrate include honeycomb or bristles. The substrate 238 further can be an accessible unit that can be periodically serviced, such as by cleaning or replacing the substrate 238 during an engine overhaul. In other embodiment, the substrate 238 may be an air-permeable, porous substrate, such as a filter, through which the particle-laden stream flows. Some non-limiting examples of an air-permeable, porous substrate 238 include a filter media of wire mesh, ceramic, ceramic foam, metal, or metallic foam.

The impeller assembly 206 may include a partition 240 separating the impeller bleed 224 from a chamber 242 in which the substrate 238 is provided. The partition 240 has at least one impingement aperture 244 through which the particle-laden stream passes before contact with the substrate 238. The impingement aperture 242 can be oriented normal to a surface of the substrate 238 as shown in FIG. 9, or can be oriented at a non-orthogonal angle to the surface. In operation, the particle-laden stream emitted from the impeller bleed 224 can impinge on the substrate 238, with at least some of the particles becoming entrapped in the substrate 238. The chamber 242 can be in fluid communication with the turbine for cooling the turbine.

The impeller assembly 206 further includes a bypass passage 246 fluidly coupled to the particle-laden stream and defining a fluid bypass around the substrate 238 downstream of the impeller bleed 224. As the particle-laden stream exits the impeller bleed 224, at least a portion of the particle-laden stream contacts the substrate 238, which can retain at least some of the particles in the particle-laden stream. However, as the substrate 238 fills with particles, the particle-laden stream can bypass the substrate 238 via the bypass passage 246. This maintains air flow through the impeller bleed 224 and into the chamber 242.

The bypass passage 246 can be at least partially defined between the partition 240 and the substrate 238. As shown, the bypass passage 246 is partially defined by a space 248 between the partition 240 and the substrate 238, and partially defined by the chamber 242.

Figure 10:
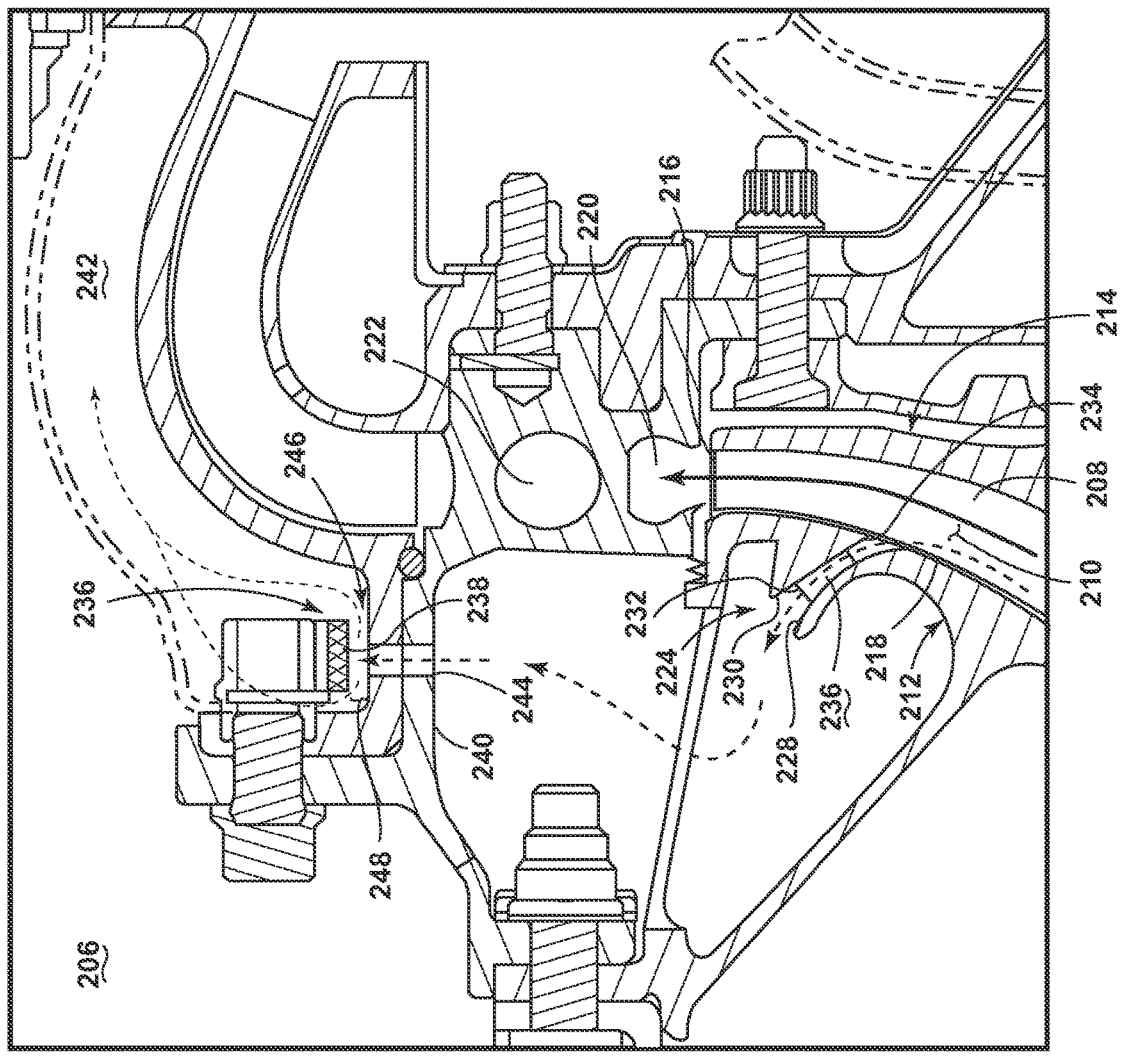
FIG. 10 is a schematic view showing an engine component for the engine from FIG. 1 according to a ninth embodiment of the invention.

FIG. 10 is a schematic view showing an engine component for the engine from FIG. 1 according to a ninth embodiment of the invention. The ninth embodiment is substantially similar to the eighth embodiment, and like elements are referred to with the same reference numerals. In the ninth embodiment, the impeller bleed 224 is not provided at the trailing edge 216 of the impeller blade 208, but rather is provided in the impeller shroud 212, upstream of the trailing edge 216 of the impeller blade 208. The dividing wall shown has apertures (not shown) to allow passage of the flow.

The various embodiments of systems, methods, and other devices related to the invention disclosed herein provide improved cooling for turbine engine structures. One advantage that may be realized in the practice of some embodiments of the described systems is that particles can be removed from a cooling fluid stream in a turbine engine to provide cleaner air to the portion of the engine to be cooled. Another advantage that may be realized in the practice of some embodiments of the described systems is that the provision of the bypass passage offers a fail-safe system whereby the flow through the engine component is uninterrupted as the particle collector fills with particles. Yet another advantage that may be realized in the practice of some embodiments of the described systems is that the particle collector is removable from the engine component for periodic cleaning and or replacement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An engine component for a turbine engine, the turbine engine generating a fluid stream, comprising:
a particle separator having an inlet receiving the fluid stream, a scavenge outlet emitting a particle-laden stream, and a separator outlet emitting a reduced-particle stream;
a particle collector in fluid communication with the scavenge outlet and comprising a substrate configured to retain at least some of the particles from the particle-laden stream; and
a bypass passage fluidly coupled to the particle-laden stream and defining a fluid bypass around the substrate downstream of the scavenge outlet;
wherein at least a portion of the particle-laden stream contacts the substrate which retains at least some of the particles, and as the substrate fills with particles, the particle-laden stream can bypass the substrate via the bypass passage.

2. The engine component from claim 1, wherein the particle collector further comprises a baffle between the scavenge outlet and the substrate, the baffle comprising at least one impingement aperture through which the particle-laden stream passes before contact with the substrate.

3. The engine component of claim 2, wherein the impingement aperture is oriented generally normal to a surface of the substrate confronting the baffle.

4. The engine component of claim 2, wherein the bypass passage is at least partially defined between the baffle and the substrate.

5. The engine component of claim 4, wherein the bypass passage comprises an opening between the baffle and a wall of the engine component.

6. The engine component from claim 2 and further comprising a wall defining an interior chamber, wherein the substrate and the baffle are provided within the interior chamber.

7. The engine component of claim 6, wherein the bypass passage comprises an opening between the baffle and a wall of the engine component.

8. The engine component from claim 1, wherein the particle collector comprises a body having a receiving opening offset from the scavenge outlet.

9. The engine component of claim 8, wherein the bypass passage is at least partially defined by an opening between the body and the scavenge outlet.

10. The engine component from claim 1, wherein the substrate has an upstream surface confronting the particle-laden stream emitted from the scavenge outlet and a downstream surface opposite the upstream surface, and wherein the particle-laden stream can flow through the substrate from the upstream surface to the downstream surface.

11. The engine component from claim 10, wherein the particle collector comprises a standoff between the downstream surface of the substrate and a wall of the engine component to define an air flow path between the downstream surface and the wall.

12. The engine component from claim 11, wherein the particle collector further comprises a baffle between the scavenge outlet and the substrate, the baffle comprising at least one impingement aperture through which the particle-laden stream passes before contact with the substrate.

13. The engine component from claim 10, wherein the particle collector comprises a body having a receiving opening in fluid communication with the scavenge outlet.

14. The engine component from claim 13, wherein the receiving opening is offset from the scavenge outlet.

15. The engine component from claim 13, wherein the ratio of the diameter defined by the receiving opening to the diameter defined by the scavenge outlet is 1:2 to 3:2.

16. The engine component from claim 15, wherein the distance between the receiving opening and the scavenge outlet is 0 to 5 times the diameter of the scavenge outlet.

17. The engine component from claim 1, wherein the substrate has a surface confronting the particle-laden stream emitted from the scavenge outlet, and wherein the at least a portion of the particle-laden stream that contacts the substrate impacts and traverses along the surface.

18. The engine component from claim 1 and further comprising a wall having a purge hole and at least partially defining an interior chamber, wherein the substrate is provided within the interior chamber and wherein the purge hole comprises a raised edge extending from the wall.

19. The engine component of claim 18, wherein the raised edge extends at a non-orthogonal angle relative to the wall surrounding the purge hole.

20. The engine component from claim 1, wherein the substrate comprises one of wire mesh, honeycomb, bristles, ceramic, ceramic foam, metal, or metallic foam.

21. The engine component from claim 1, wherein the substrate comprises an air-permeable, porous substrate.

22. The engine component from claim 1, wherein the engine component is an inducer assembly, a shroud, a combustor liner, a nozzle, a blade, a vane, an impeller, or a compressor bleed port.

23. The engine component from claim 1, wherein the particle separator comprises a centrifugal separator.

24. An engine component for a turbine engine, the turbine engine generating a particle-laden fluid stream, comprising:
a particle collector in fluid communication with the particle-laden fluid stream and comprising a substrate configured to retain at least some of the particles from the particle-laden fluid stream; and
a bypass passage fluidly coupled to the particle-laden fluid stream and defining a fluid bypass around the substrate;
wherein at least a portion of the particle-laden fluid stream contacts the substrate which retains at least some of the particles, and as the substrate fills with particles, the particle-laden fluid stream can bypass the substrate via the bypass passage.

25. The engine component from claim 24, wherein the particle collector further comprises a baffle upstream of the substrate, the baffle comprising at least one impingement aperture through which the particle-laden stream passes before contact with the substrate.

26. The engine component of claim 25, wherein the impingement aperture is oriented generally normal to a surface of the substrate confronting the baffle.

27. The engine component of claim 25, wherein the bypass passage is at least partially defined between the baffle and the substrate.

28. The engine component of claim 27, wherein the bypass passage comprises an opening between the baffle and a wall of the engine component.

29. The engine component from claim 25 and further comprising a wall defining an interior chamber, wherein the substrate and the baffle are provided within the interior chamber.

30. The engine component of claim 29, wherein the bypass passage comprises an opening between the baffle and a wall of the engine component.

31. The engine component from claim 30, wherein the substrate has an upstream surface confronting the particle-laden stream emitted from the baffle and a downstream surface opposite the upstream surface, and wherein the particle-laden stream can flow through the substrate from the upstream surface to the downstream surface.

32. The engine component from claim 24, wherein the substrate has an upstream surface confronting the particle-laden stream and a downstream surface opposite the upstream surface, and wherein the particle-laden stream can flow through the substrate from the upstream surface to the downstream surface.

33. The engine component from claim 32, wherein the particle collector comprises a standoff between the downstream surface of the substrate and a wall of the engine component to define an air flow path between the downstream surface and the wall.

34. The engine component from claim 33, wherein the particle collector further comprises a baffle upstream of the substrate, the baffle comprising at least one impingement aperture through which the particle-laden stream passes before contact with the substrate.

35. The engine component from claim 24, wherein the substrate has a surface confronting the particle-laden stream, and wherein the at least a portion of the particle-laden stream that contacts the substrate impacts and traverses along the surface.

36. The engine component from claim 24 and further comprising a wall having a purge hole and at least partially defining an interior chamber, wherein the substrate is provided within the interior chamber and wherein the purge hole comprises a raised edge extending from the wall.

37. The engine component of claim 36, wherein the raised edge extends at a non-orthogonal angle relative to the wall surrounding the purge hole.

38. The engine component from claim 24, wherein the substrate comprises one of wire mesh, honeycomb, bristles, ceramic, ceramic foam, metal, or metallic foam.

39. The engine component from claim 24, wherein the substrate comprises an air-permeable, porous substrate.

40. The engine component from claim 24, wherein the engine component is an inducer assembly, a shroud, a combustor liner, a nozzle, a blade, a vane, an impeller, or a compressor bleed port.

* * * * *